US012807289B2

(12) United States Patent
Mohideen

(10) Patent No.: US 12,807,289 B2
(45) Date of Patent: Nov. 24, 2026

(54) HYBRID AERIAL HYDRO DRONE

(71) Applicant: Farlin Anooz Mohideen, Belmont (AU)

(72) Inventor: Farlin Anooz Mohideen, Belmont (AU)

( * ) Notice: Subject to any disclaimer, the term of this patent is extended or adjusted under 35 U.S.C. 154(b) by 0 days.

(21) Appl. No.: 19/110,695

(22) PCT Filed: Sep. 13, 2023

(86) PCT No.: PCT/AU2023/050881
§ 371 (c)(1),
(2) Date: Mar. 11, 2025

(87) PCT Pub. No.: WO2024/055069
PCT Pub. Date: Mar. 21, 2024

(65) Prior Publication Data
US 2026/0077843 A1 Mar. 19, 2026

(30) Foreign Application Priority Data
Sep. 14, 2022 (AU) ................................ 2022902665

(51) Int. Cl.
*B63G 8/22* (2006.01)
*B63G 8/00* (2006.01)
(Continued)

(52) U.S. Cl.
CPC .............. *B63G 8/22* (2013.01); *B63G 8/001* (2013.01); *B63G 8/16* (2013.01); *B63G 8/36* (2013.01);
(Continued)

(58) Field of Classification Search
CPC .... B63G 2008/008; B63G 8/001; B63G 8/16; B63G 8/36; B63G 2008/002; B63G 8/22;
(Continued)

(56) References Cited

U.S. PATENT DOCUMENTS 3,251,328 A * 5/1966 Rigsby ..................... B63G 8/22 114/333
6,176,679 B1 * 1/2001 Bietenhader ............ B64C 27/50 416/134 A (Continued)

FOREIGN PATENT DOCUMENTS

CN 106564349 A 4/2017
CN 111845232 A 10/2020

(Continued)

OTHER PUBLICATIONS

Written Opinion issued by the Australian Patent Office in international application No. PCT/AU2023/050881 on Oct. 12, 2023 (8 pages).

(Continued)

*Primary Examiner* — Ashesh Dangol
(74) *Attorney, Agent, or Firm* — Cherskov Flaynik & Gurda, LLC

(57) ABSTRACT

A hybrid aerial hydro drone includes a body with a plurality of hydraulic thrusters supported on an outer surface of the body and configured to propel the body in a marine environment. The drone also includes a plurality of rotor arms arranged on the body, each rotor arm comprising a rotor system configured to propel the body in an aerial environment. Each rotor arm is deployably configured between a deployed position in which the rotor systems are extended from the body for aerial traversal, and a folded position in which the arms are hydrodynamically folded behind the body for marine traversal. The body also includes a controller, an energy source, a main ballast chamber and a pump with snorkel for operation of the drone.

12 Claims, 11 Drawing Sheets

(51) Int. Cl.

| | |
|---|---|
| ***B63G 8/16*** | (2006.01) |
| ***B63G 8/36*** | (2006.01) |
| ***B64U 10/13*** | (2023.01) |
| ***B64U 10/70*** | (2023.01) |
| ***B64U 20/75*** | (2023.01) |
| ***B64U 30/293*** | (2023.01) |
| ***B64U 40/20*** | (2023.01) |
| ***B64U 50/16*** | (2023.01) |
| ***B64U 50/19*** | (2023.01) |

(52) U.S. Cl.
CPC ............. *B64U 10/70* (2023.01); *B64U 20/75* (2023.01); *B64U 30/293* (2023.01); *B64U 40/20* (2023.01); *B64U 50/16* (2023.01); *B63G 2008/002* (2013.01); *B64U 10/13* (2023.01); *B64U 50/19* (2023.01)

(58) Field of Classification Search
CPC ......... B63B 13/00; B64C 35/00; B64C 37/00; B64C 35/008; B64U 20/75; B64U 10/70; B64U 10/14; B64U 2101/00; B64U 50/16
See application file for complete search history.

(56) References Cited

U.S. PATENT DOCUMENTS

| | | | | |
|---|---|---|---|---|
| 2018/0257772 | A1* | 9/2018 | Bernhardt | B64C 39/04 |
| 2019/0310658 | A1* | 10/2019 | Zhu | B64U 50/19 |
| 2021/0261248 | A1* | 8/2021 | Clark | G05D 1/0038 |
| 2022/0078389 | A1* | 3/2022 | Jiang | H04N 23/76 |
| 2022/0315218 | A1* | 10/2022 | Ji | B64U 50/30 |

FOREIGN PATENT DOCUMENTS

| | | | | |
|---|---|---|---|---|
| CN | 212604325 | U | 2/2021 | |
| CN | 113524998 | B | 7/2022 | |
| GB | 112893 | A * | 1/1918 | B63G 8/22 |
| WO | 2019232617 | A1 | 12/2019 | |

OTHER PUBLICATIONS

International Preliminary Report on Patentability issued by the Australian Patent Office in international application No. PCT/AU2023/050881 on Feb. 28, 2024 (6 pages).

International Search Report issued by the Australian Patent Office in international application No. PCT/AU2023/050881 on Oct. 12, 2023 (4 pages).

* cited by examiner

HYBRID AERIAL HYDRO DRONE

TECHNICAL FIELD

This invention relates broadly to the field of drones such as unmanned aerial vehicles (UAV) and unmanned underwater vehicles (UUV), and more specifically to a hybrid aerial hydro drone.

BACKGROUND ART

The following discussion of the background art is intended to facilitate an understanding of the present invention only. The discussion is not an acknowledgement or admission that any of the material referred to is or was part of the common general knowledge as at the priority date of the application.

Drones, such as unmanned aerial vehicles (UAV) and unmanned underwater vehicles (UUV), are aircraft and submersible vehicles without any human occupants, such as a pilot, crew or passengers on board. Often, drones are capable of remote-controlled and/or autonomous operation. Such unmanned autonomous vehicles have been the focus of many development efforts with a large range of applications. Ongoing development has seen improved capabilities of drones, for example in the military field. Remotely operated or autonomous UAVs, for example, see widespread use in military operations around the world, as well as for non-military applications, including agriculture and surveillance. Similarly, unmanned underwater vehicles (UUVs) are used in various applications, including as remotely operated vehicles (ROVs) which are applied in several commercial field operations, e.g. oil and gas extraction in deep waters.

Both kinds of known vehicles, i.e. unmanned aerial vehicles (UAV) and unmanned underwater vehicles (UUV), are well adapted to operate in their own environments, being air and water, respectively, but some situations may require a single vehicle capable of working in both environments. In particular, submerged traversal in a marine environment is a shortcoming, where appropriate control and ballast are required. Accordingly, Applicant has identified a need in the art for a drone capable of functioning as both a UAV and a UUV and the current invention was conceived with this goal in mind.

SUMMARY OF THE INVENTION

The skilled addressee is to appreciate that reference herein to a 'ballast chamber' broadly refers to a compartment that is configured to hold water to be used as ballast to provide hydrostatic stability for a vessel in a marine environment, such as a drone, to reduce or control buoyancy, to correct trim or list, to provide a more even load distribution along a hull of the vessel, to increase draft, and/or to improve seakeeping or hydro-keeping ability via suitable weight adjustment. Accordingly, reference to a marine environment is made in an inclusive sense to include any suitable body of water, such as sea, dam, lake, river, pool, tank, pipe, etc.

According to an aspect of the invention there is provided a hybrid aerial hydro drone comprising:

- a body;
- a plurality of hydraulic thrusters supported on an outer surface of the body and configured to propel said body in a marine environment, the hydraulic thrusters circumferentially spaced about the outer surface to facilitate controlled marine propulsion; and

- a plurality of rotor arms arranged on the body, each rotor arm comprising a rotor system configured to propel said body in an aerial environment, each arm deployably configured between a deployed position in which the rotor systems are extended from the body for aerial traversal, and a folded position in which the arms are hydrodynamically folded behind the body for submerged marine traversal;
- wherein the body includes a controller, an energy source, a main ballast chamber and a pump, said controller configured to:
  - for aerial traversal, actuate the rotor arms into the deployed position, operate the pump to discharge liquid from the main ballast chamber and control the rotor systems as required for controlled flight; and
  - for marine traversal, actuate the rotor arms into the folded position, operate the pump to discharge liquid from the main ballast chamber and control the hydraulic thrusters as required for submerged marine traversal.

In an embodiment, each rotor arm comprises a ballast chamber, the controller configured to:

- for aerial traversal, discharge liquid from said rotor arm ballast chambers; and
- for marine traversal, regulate and control liquid ballast within the respective rotor arm ballast chambers to facilitate controlled submerged marine propulsion.

In an embodiment, the body comprises a fluid-tight pod defining a streamlined shape to facilitate aerodynamic and hydrodynamic traversal.

In an embodiment, the body comprises a double-hulled structure.

In an embodiment, the body defines an internal cargo space accessible via a sealable hatch.

In an embodiment, the controller is configured to monitor and/or regulate an internal temperature and/or pressure of the internal cargo space.

In an embodiment, the hydraulic thrusters are swivelably arranged on the body and controllable by the controller to allow steering in a marine environment.

In an embodiment, the drone comprises four hydraulic thrusters each arranged on a quadrant of the body.

In an embodiment, the drone comprises four rotor arms arranged in a quadcopter configuration on the body.

In an embodiment, each rotor arms comprises an electromechanical actuator under control of the controller and configured to actuate the arms between the deployed and folded positions, as required.

In an embodiment, each rotor system comprises a propellor and electric motor arranged on an end of the rotor arm.

In an embodiment, the pump is configured to charge the main ballast chamber with liquid from the marine environment, as required, to regulate and control ballast for marine traversal.

In an embodiment, the controller and pump are configured to charge or discharge each rotor arm ballast chamber with fluid to regulate and control ballast for marine traversal.

In an embodiment, the pump is selectively arranged in fluid contact with each rotor arm ballast chamber by means of suitable valves and fluid conduits.

In an embodiment, the pump comprises a snorkel to facilitate charging and discharging of fluid from the ballast chambers.

In an embodiment, the pump is configured to draw or expel atmospheric air in order to discharge or charge, respectively, liquid from the respective ballast chambers.

In an embodiment, each rotor arm ballast chamber comprises a piston and cylinder arrangement configured to pneumatically syringe liquid, such as water from the marine environment, into or out of said ballast chamber under control of the controller to regulate ballast of said rotor arm.

In an embodiment, the controller comprises at least one inertial measurement unit (IMU) to allow said controller to calculate altitude, velocity and/or position of the drone.

In an embodiment, the energy source comprises at least one electrochemical cell.

In an embodiment, the drone includes landing gear to support the drone during take-off and landing.

In an embodiment, the landing gear is configured to be stowed within the body or hydrodynamically folded behind the body for marine traversal.

According to a further aspect of the invention there is provided a hybrid aerial hydro drone substantially as herein described and/or illustrated.

BRIEF DESCRIPTION OF THE DRAWINGS

The description will be made with reference to the accompanying drawings in which.

DETAILED DESCRIPTION OF EMBODIMENTS

Figure 1:
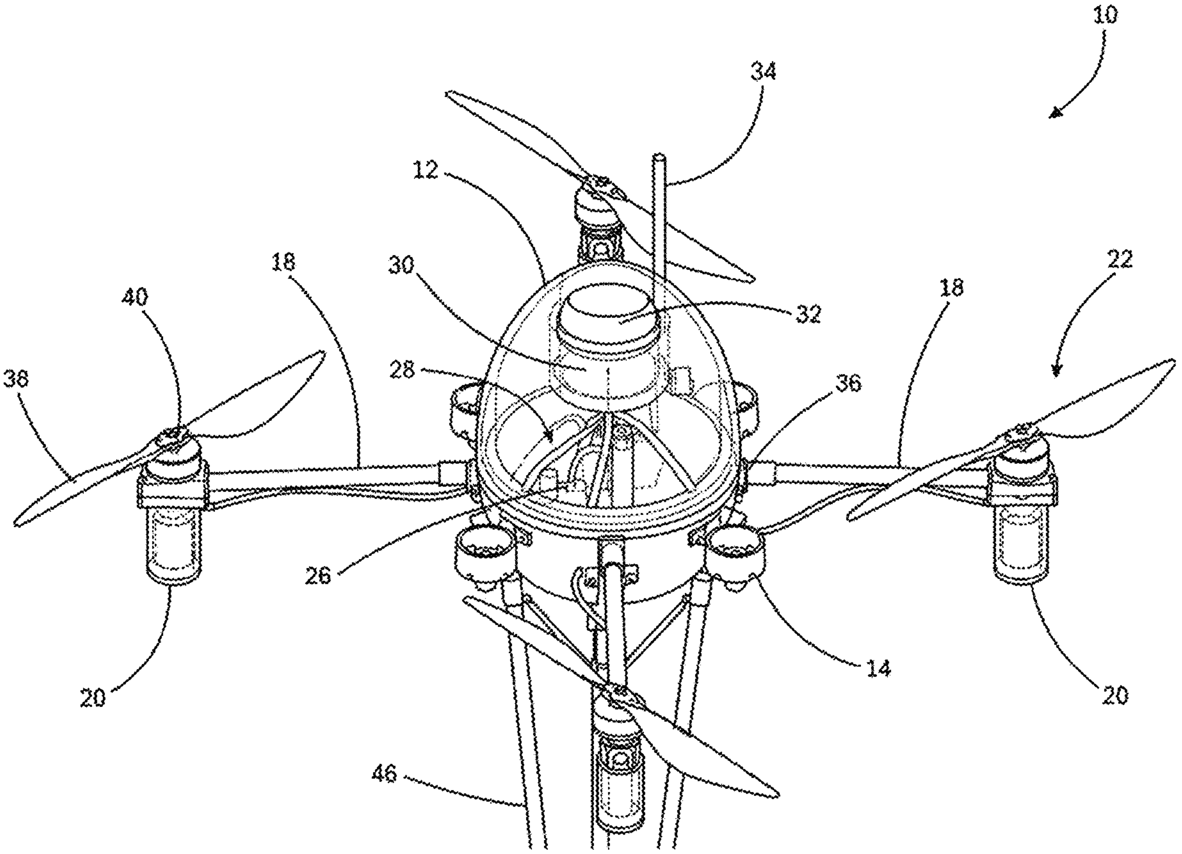
FIG. 1 is a diagrammatic perspective view representation of one embodiment of a hybrid aerial hydro drone, in accordance with an aspect of the present invention.
Figure 2:
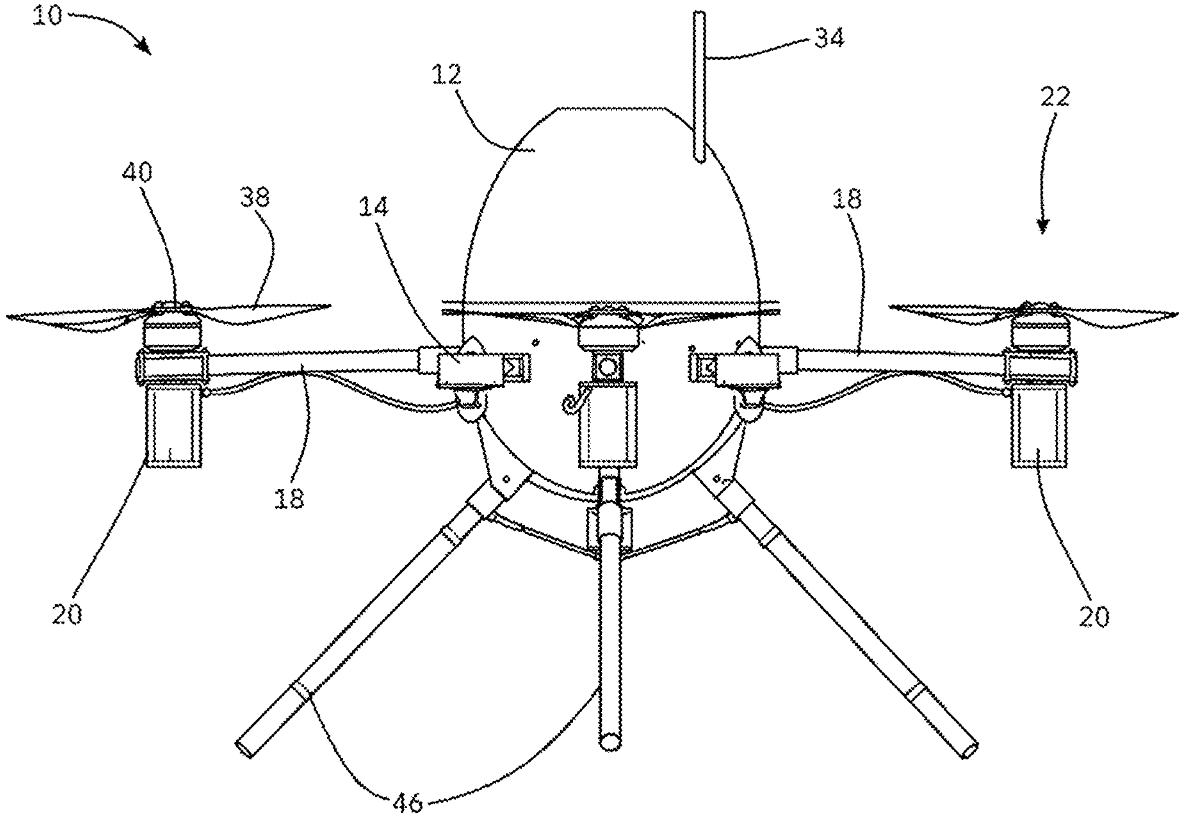
FIG. 2 is a diagrammatic side view representation of the hybrid aerial hydro drone of FIG. 1, with landing gear deployed and the rotor arms in the deployed position.
Figure 3:
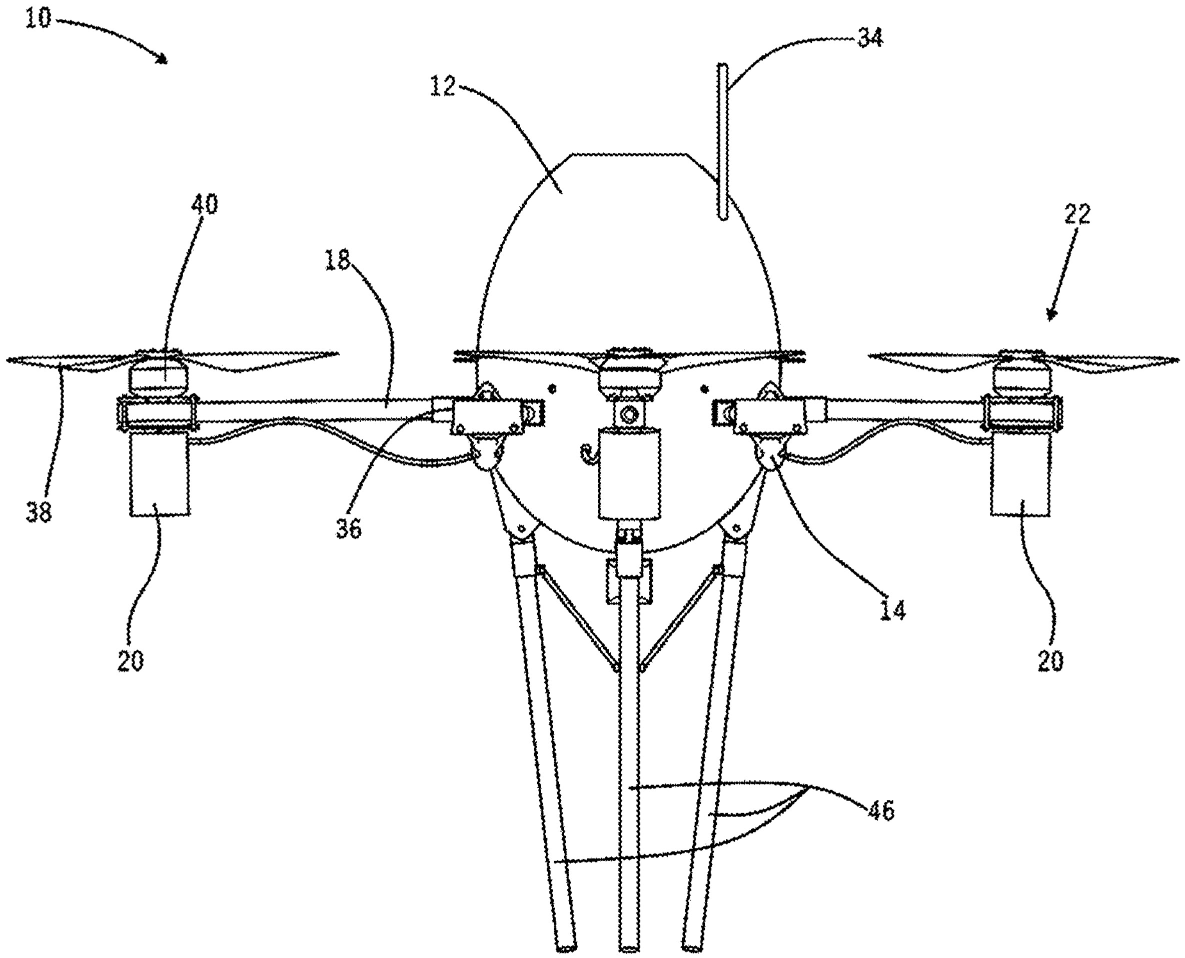
FIG. 3 is diagrammatic side-view representation of the hybrid aerial hydro drone of FIG. 1, with the landing gear hydrodynamically folded behind the body for marine traversal.
Figure 4:
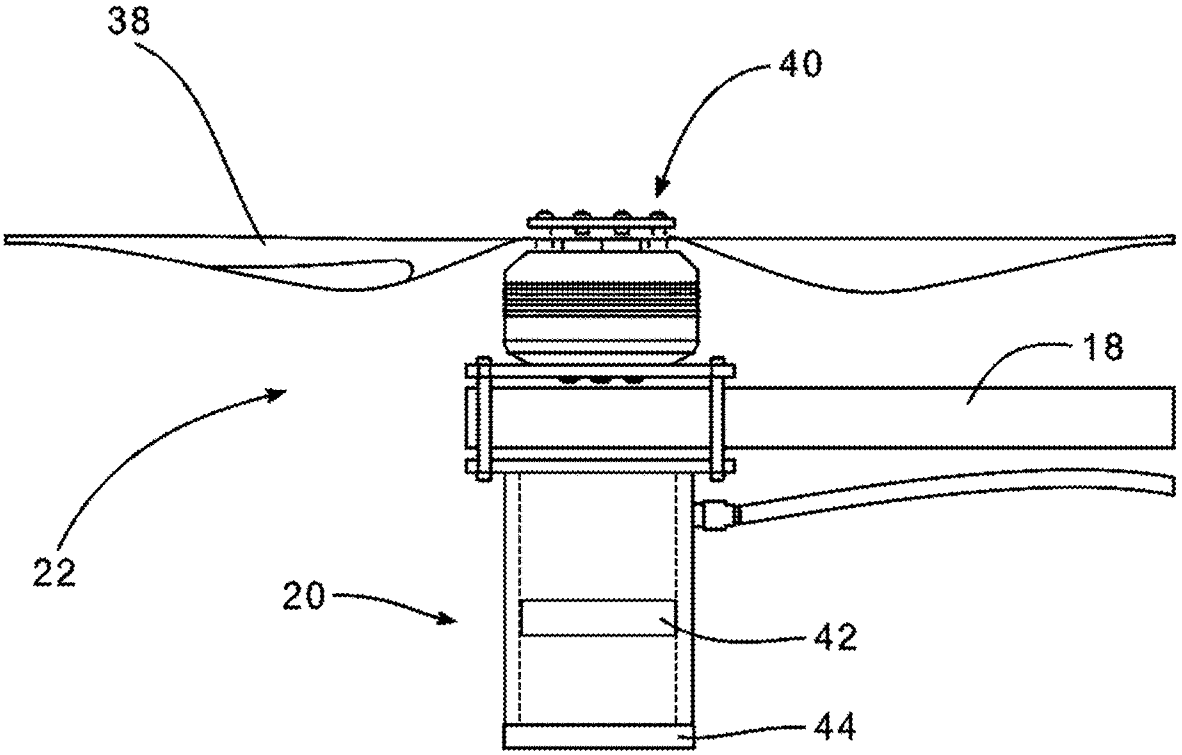
FIG. 4 is a diagrammatic closer-view representation of a rotor arm with rotor system of the hybrid aerial hydro drone of FIG. 1.
Figure 5:
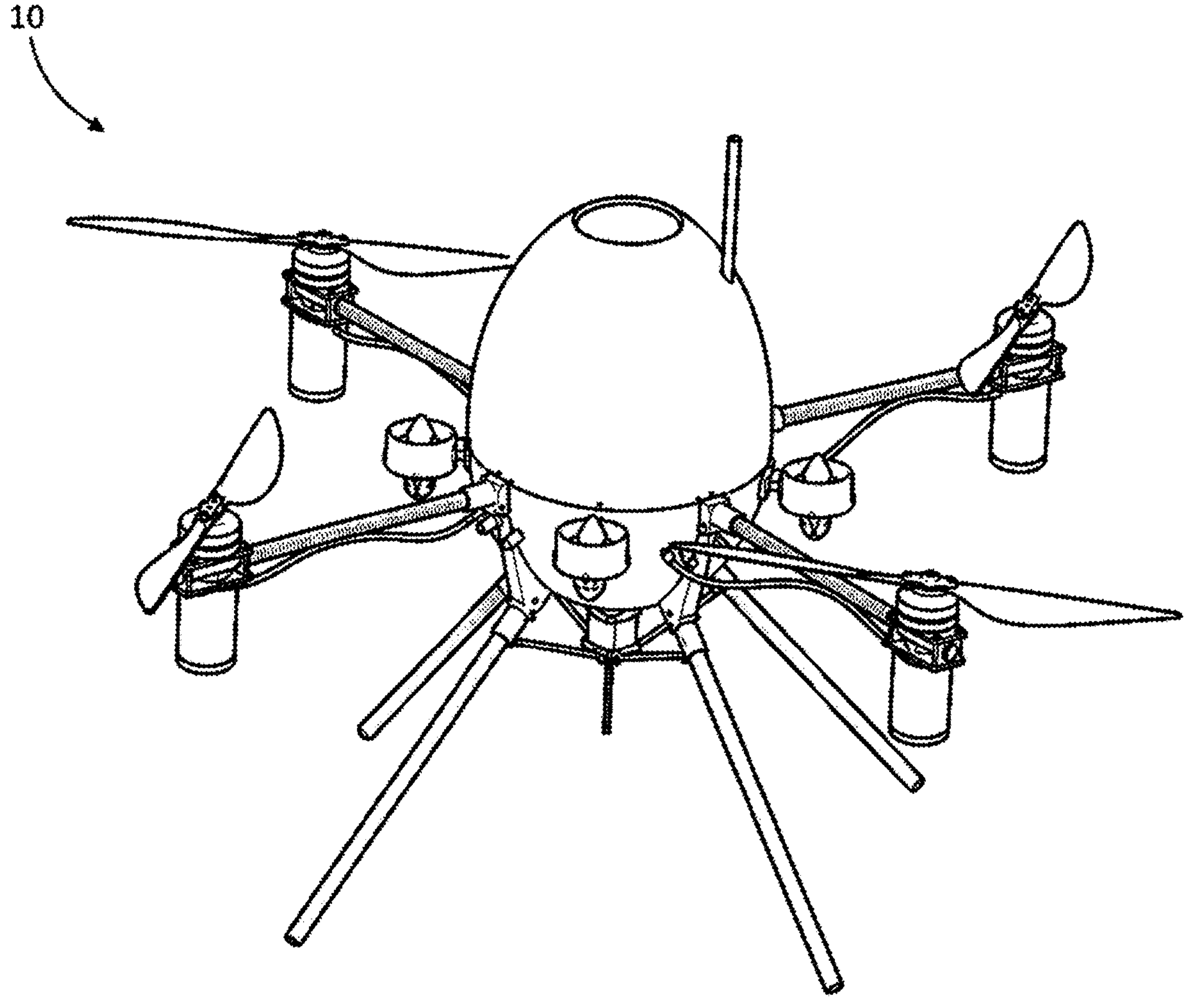
FIG. 5 is a diagrammatic perspective-view representation of the hybrid aerial hydro drone of FIG. 1.
Figure 6:
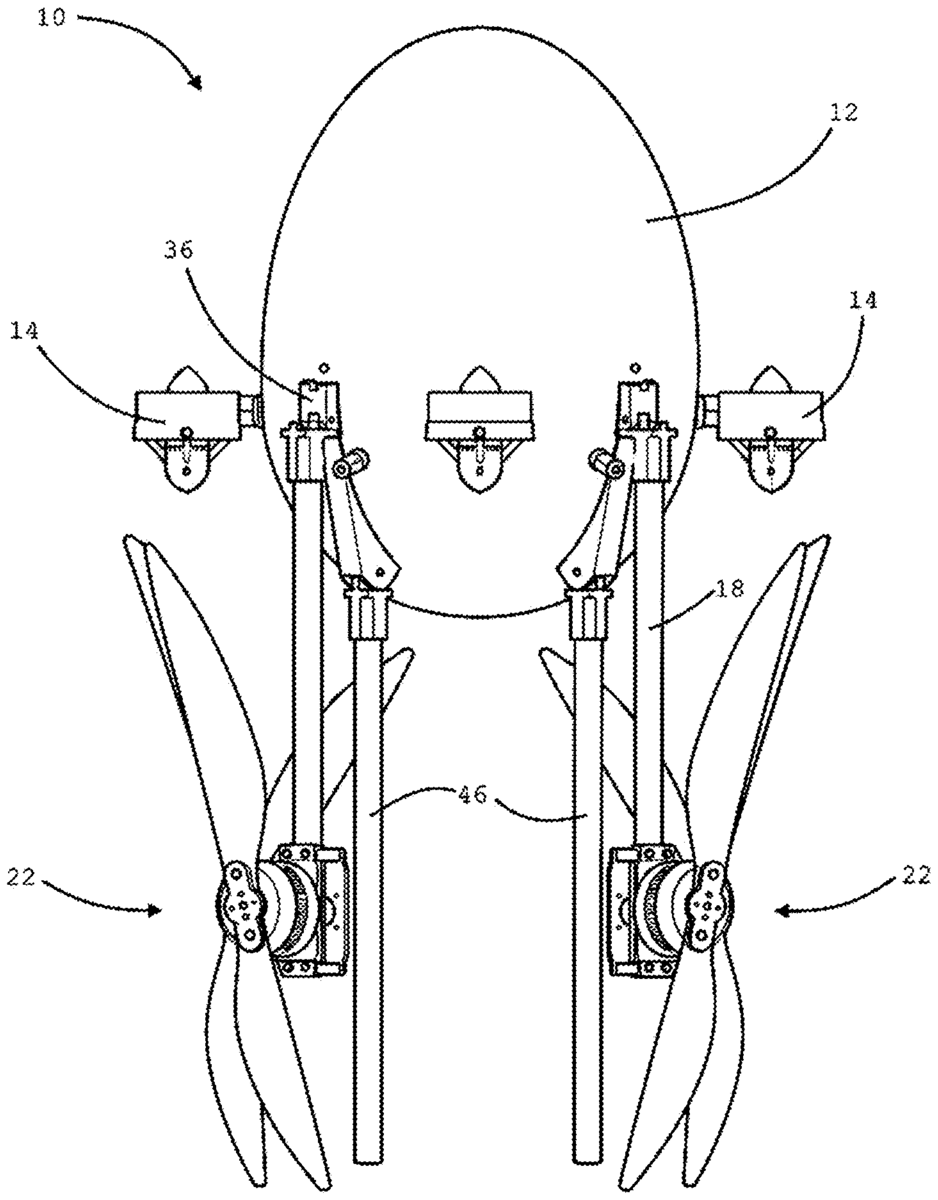
FIG. 6 is a diagrammatic side-view representation of the hybrid aerial hydro drone of FIG. 1 (with ballast components not shown), showing the rotor arms in the folded position.
Figure 7:
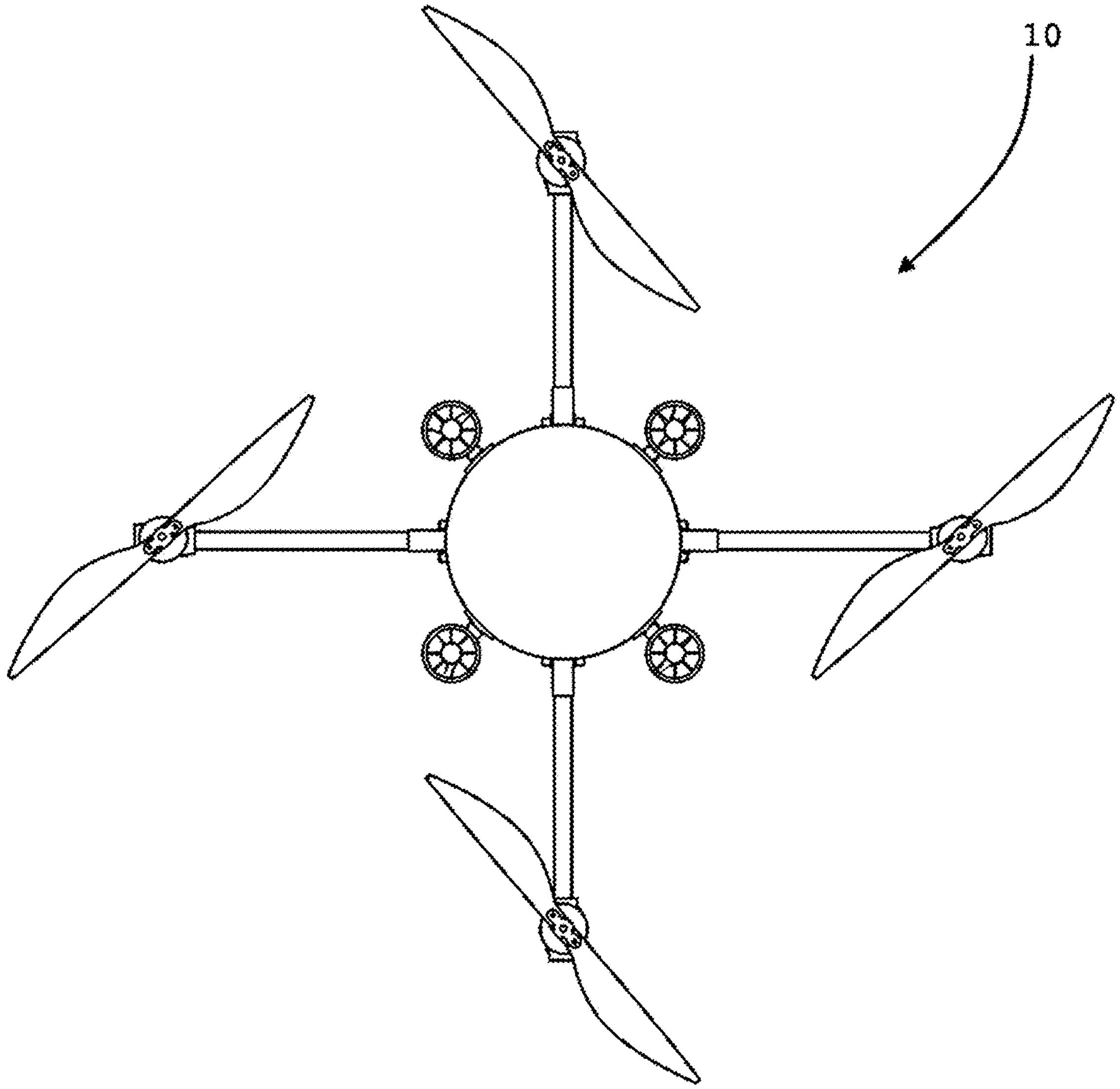
FIG. 7 is diagrammatic top-view representation of the hybrid aerial hydro drone of FIG. 6, with the rotor arms in the deployed position for aerial traversal.
Figure 8:
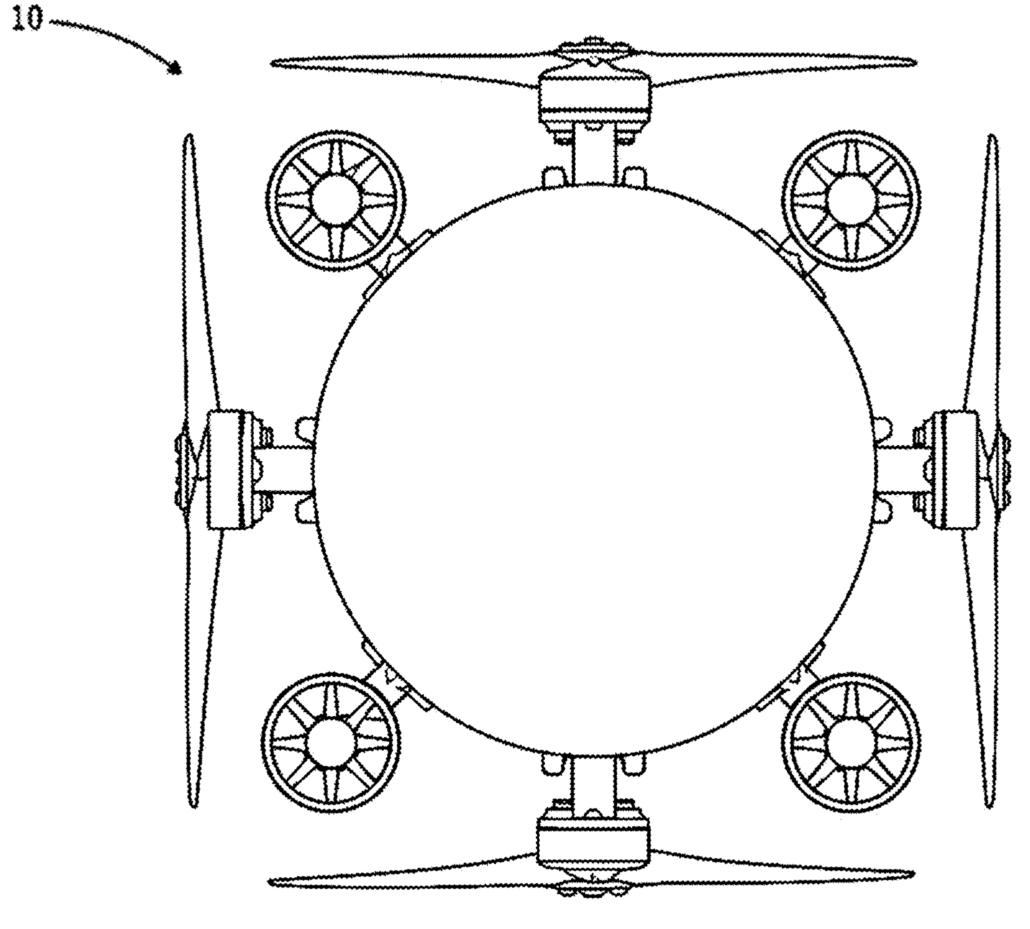
FIG. 8 is a diagrammatic top-view representation of the hybrid aerial hydro drone of FIG. 7, with the rotor arms in the folded position for marine traversal.
Figure 9:
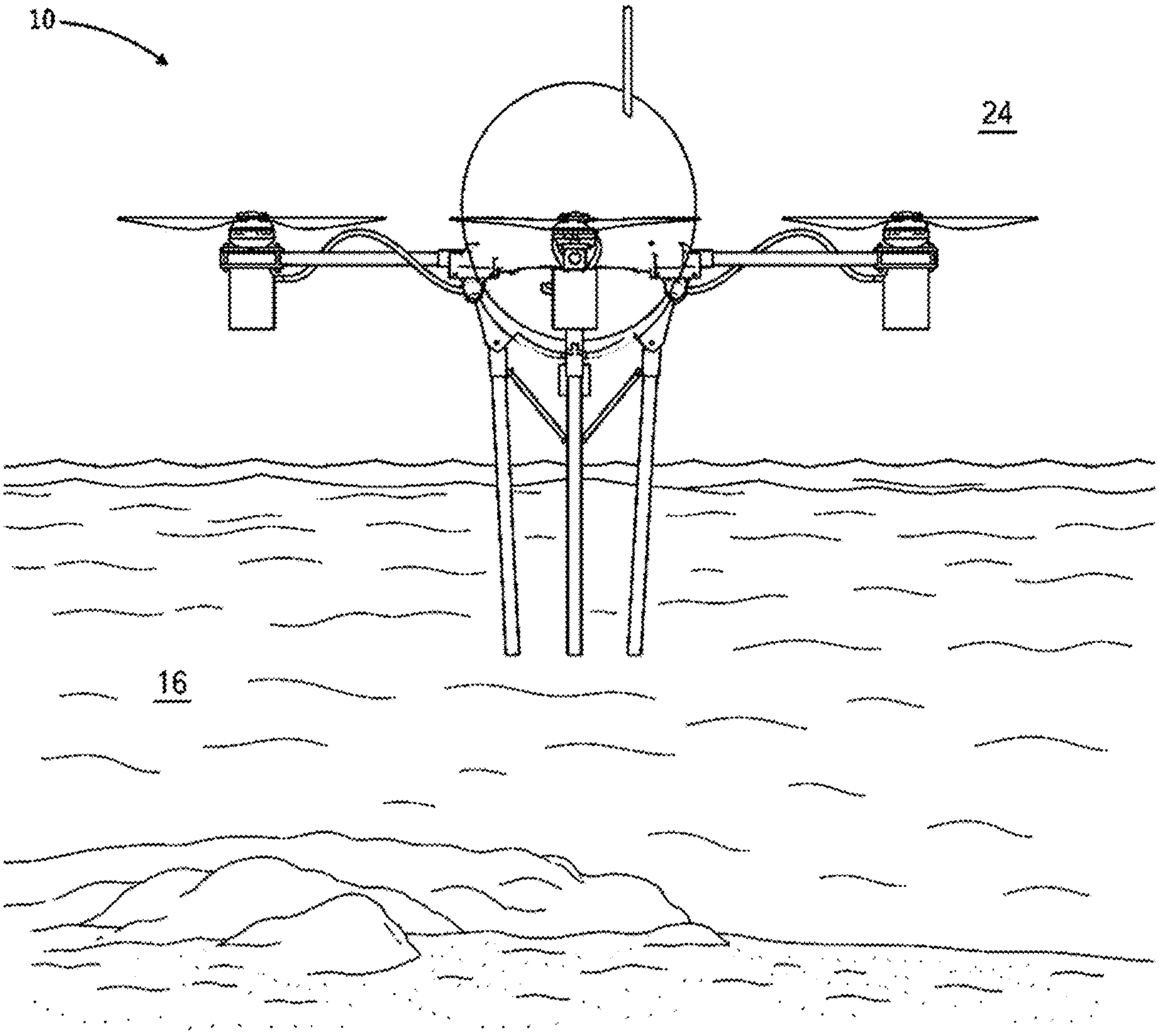
FIG. 9 is a diagrammatic side-view representation the hybrid aerial hydro drone of FIG. 1 transitioning between marine and aerial environments.
Figure 10:
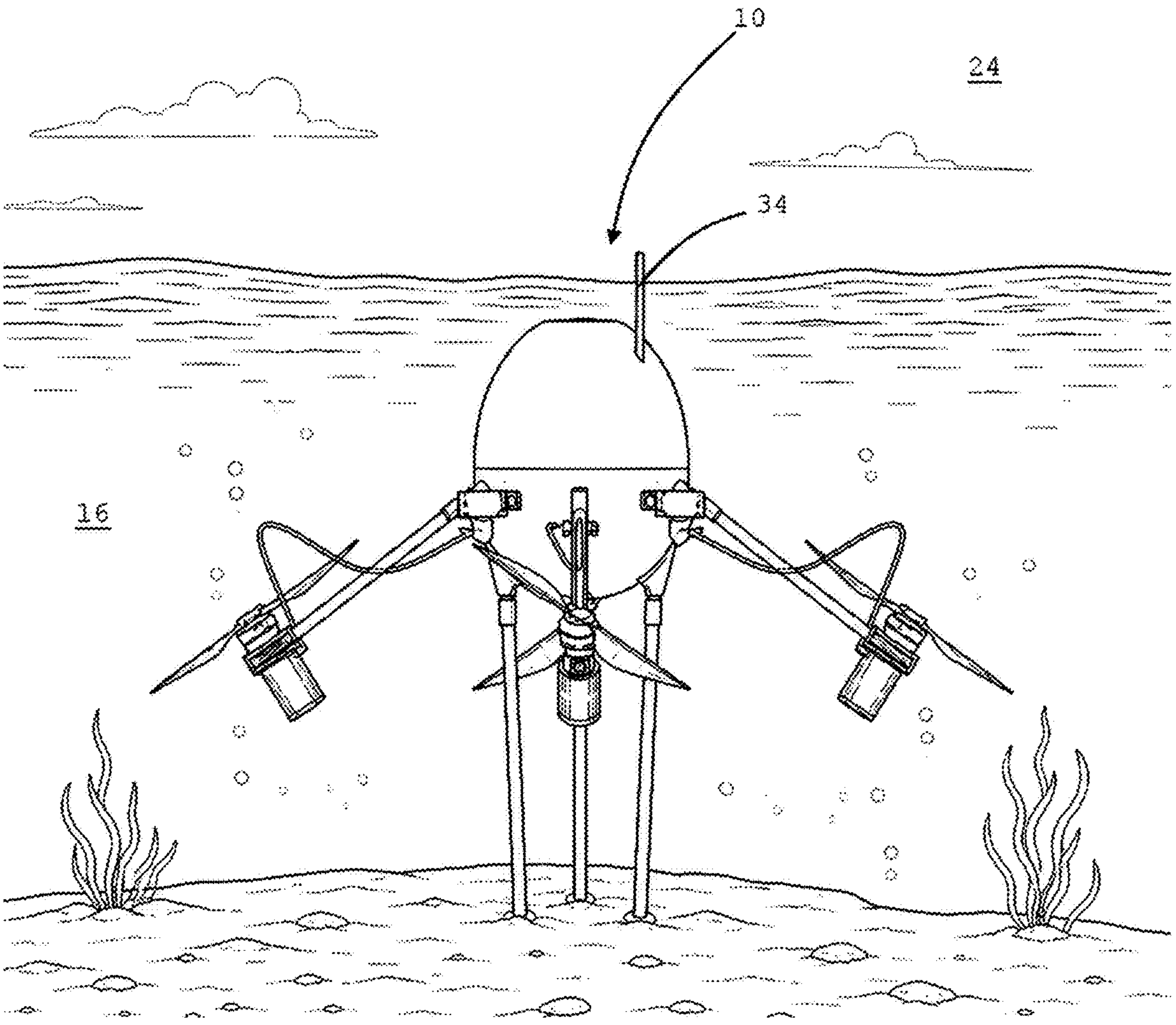
FIG. 10 is a diagrammatic side-view representation the hybrid aerial hydro drone of FIG. 1 entering or exiting a marine environment.

Further features of the present invention are more fully described in the following description of several non-limiting embodiments thereof. This description is included solely for the purposes of exemplifying the present invention to the skilled addressee. It should not be understood as a restriction on the broad summary, disclosure or description of the invention as set out above.

In the figures, incorporated to illustrate features of the example embodiment or embodiments, like reference numerals are used to identify like parts throughout. Additionally, features, mechanisms and aspects well-known and understood in the art will not be described in detail, as such features, mechanisms and aspects will be within the understanding of the skilled addressee.

Broadly, the present invention provides for a drone 10 capable of operating in both aerial and marine environments, i.e. in air and in water, as required. To achieve such hybrid operation, drone 10 comprises various specific configurations and features as described in more detail herein.

With reference now to the accompanying figures, there is shown one possible embodiment of a hybrid aerial hydro drone 10 which generally includes a body 12, a plurality of hydraulic thrusters 14 supported on an outer surface of the body 12, and a plurality of rotor arms 18 arranged on the body 12, as shown. The body 12 may comprise a fluid-tight pod defining a streamlined shape to facilitate aerodynamic and hydrodynamic traversal, as shown. Of course, the skilled addressee is to appreciate that the body may take a variety of forms and such variations are possible and expected.

Figure 11:
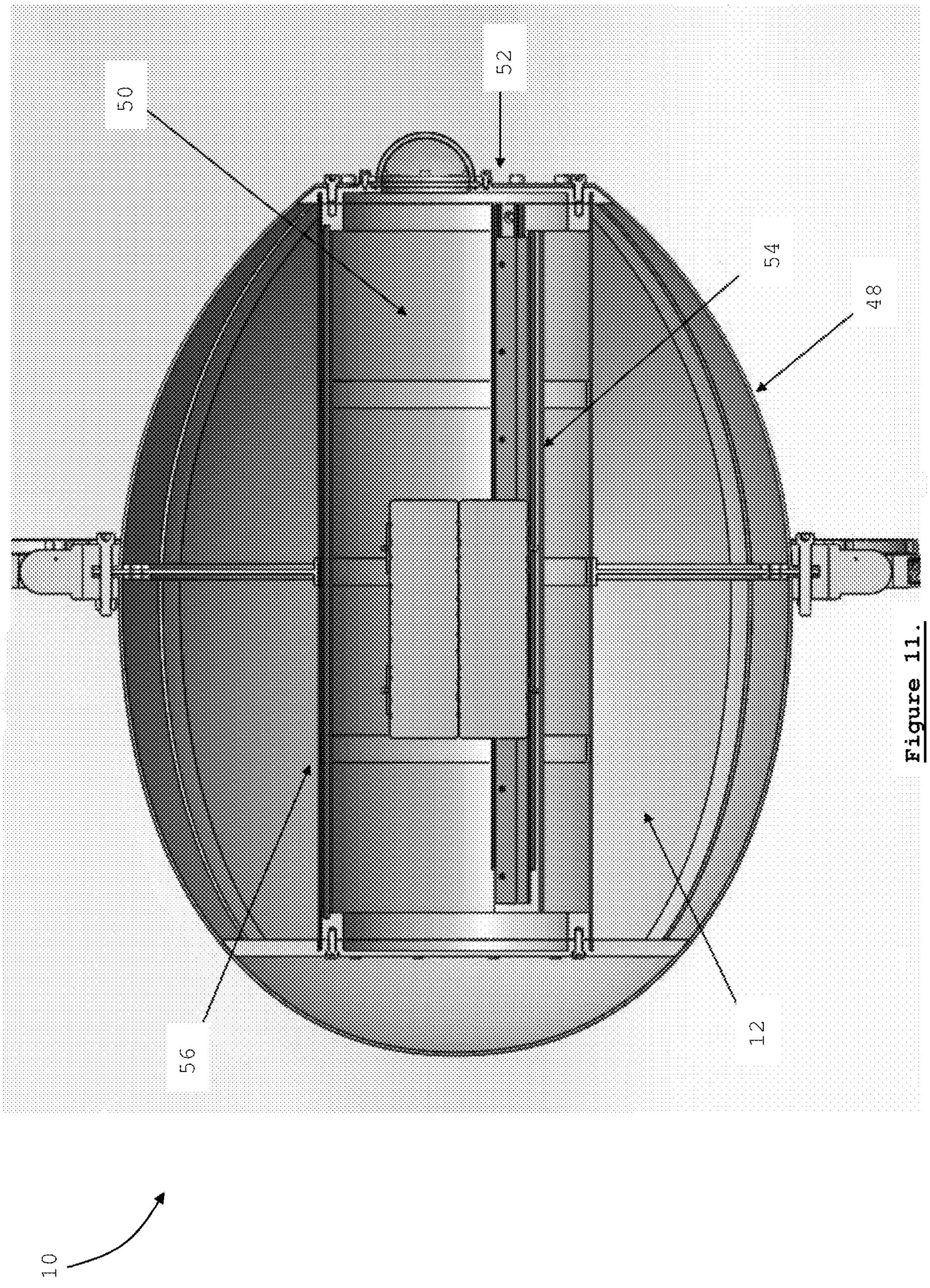
FIG. 11 is a diagrammatic cross-sectional side-view representation of one embodiment of the hybrid aerial hydro drone, showing a double-hulled structure with an internal cargo space.

In one embodiment, as exemplified in FIG. 11, the body 12 comprises a double-hulled structure 48. In one embodiment, the body 12 also defines an internal cargo space 50 which is typically accessible via a sealable hatch 52. The internal cargo space 50 may also include a rail for securing cargo thereon, or the like. In one embodiment, the controller 26 may also be configured to monitor and/or regulate an internal temperature and/or pressure of the internal cargo space 50. For example, suitable valves and/or electric heating elements 56 may be employed to regulate such internal temperature and/or pressure, as required, or the like.

The drone 10 generally includes a plurality of hydraulic thrusters 14 supported on an outer surface of the body 12 and which are configured to propel said body 12 in a marine environment 16. In one embodiment, the hydraulic thrusters 14 are circumferentially spaced on the outer surface of the body 12 to facilitate controlled propulsion in a marine environment. Typically, the hydraulic thrusters 14 are swivelably arranged on the body and controllable by a controller 26, described in more detail below, to allow steering of the drone 10 in a marine environment 16. In one embodiment, the drone 10 comprises four hydraulic thrusters 14 arranged at a quadrant of the body 12, as shown, but variations hereon are possible and anticipated. The skilled addressee is to appreciate that via such appropriate spacing of hydraulic thrusters 14 on the body 12, e.g. arranging a hydraulic thruster 14 on each quadrant of the body 12, or the like, typically facilitates submerged marine traversal by the drone 10.

The drone 10 also includes generally a plurality of rotor arms 18 that are arranged on the body 12. Each rotor arm 18 comprises a ballast chamber 20 and a rotor system 22 which is configured to propel the body 12 in an aerial environment 24. Typically, each rotor system 22 comprises a propellor 38 and an electric motor 40 arranged on an end of the rotor arm 18. Importantly, each rotor arm 18 is deployably configured between a deployed position in which the rotor systems 22 are extended from the body 12 for aerial traversal, and a folded position in which the rotor arms 18 are hydrodynamically folded behind the body 12 for marine traversal.

In one embodiment, the drone 10 comprises four rotor arms 18 arranged in a quadcopter configuration on the body 12, as shown, but variations hereon are possible. Typically, each rotor arm 18 comprises an electromechanical actuator

36 under control of the controller 26 and configured to actuate the arm 18 between the deployed and folded positions, as required.

The body 12 of the drone 10 further generally includes a controller 26, an energy source 28, a main ballast chamber 30 and a pump 32 with a snorkel 34, wherein the controller 26 is configured to, for aerial traversal, actuate the rotor arms 18 into the deployed position, operate the pump 32 to discharge liquid from the ballast chambers 20 and 30, and control the rotor systems 22 as required for controlled flight. Alternatively, for marine traversal, the controller 26 is configured to actuate the rotor arms 18 into the folded position, operate the pump 32 to regulate and control liquid ballast within the respective ballast chambers 20 and 30, and control the hydraulic thrusters 14 as required for marine traversal.

In one embodiment, the pump 32 is configured to charge the respective ballast chambers 20 and 30 with liquid, such as water, from the marine environment 16, as required, to regulate and control ballast for marine traversal. In one embodiment, the pump 32 is configured to draw or expel atmospheric air, via the snorkel 34, in order to discharge or charge, respectively, liquid from the respective ballast chambers 20 and 30.

For example, in one embodiment, each ballast chamber 20 of a rotor arm 18 comprises a piston 42 and cylinder 44 arrangement configured to pneumatically syringe liquid, such as water from the marine environment 16, into or out of said ballast chamber 20 via the pump 32 under control of the controller 26 to regulate ballast of said rotor arm 18. In an embodiment, the pump 32 is selectively arranged in fluid contact with each ballast chamber 20 by means of suitable valves and fluid conduits, as required.

In this manner, drone 10 is able to fly in an aerial environment 24 by means of rotor system 22. If traversal of a marine environment 16 is required, drone 10 may land on a water surface, after which the various ballast chambers 20 and 30 can be charged with water, via pump 32 and snorkel 34 typically expelling air from said chambers 20 and 30 so that water is drawn into these chambers 20 and 30, as required. The rotor arms 18 can also be actuated into the folded position in order to provide a streamlined and hydrodynamic shape to the drone 10, which can be propelled and steered by means of hydraulic thrusters 14.

Once marine traversal is completed and aerial traversal is required, drone 10 can control ballast within the chamber 20 and 30 by drawing air into the ballast chambers 30 and 30, via snorkel 34 and pump 32, in order to displace the water out of the respective ballast chambers 20 and 30. Once the water has been discharged, the drone 10 will be buoyant and float on the surface of the marine environment 16 due to the air in the ballast chambers 20 and 30. Rotor arms 18 can now be actuated into the deployed position and flight is achieved in a quadcopter configuration.

In an embodiment, the controller 26 comprises at least one inertial measurement unit (IMU) to allow the controller 26 to calculate altitude, velocity and/or position of the drone 10. In an embodiment, the energy source 28 typically comprises at least one electrochemical cell or cells to form a battery arrangement, but variations hereon are possible.

In one embodiment, the drone 10 may also include landing gear 46, such as legs, to support the drone 10 during take-off and landing on a terrestrial surface. In an embodiment, the landing gear 46 may be configured to be stowed within the body or hydrodynamically folded behind the body for marine traversal or flight.

Applicant believes it particularly advantageous that the present invention provides for a hybrid aerial hydro drone 10 which is interchangeably operable in both aerial and marine environments, as desired. The drone 10 comprises a main body 12 and rotor arms 18 all having distinct ballast chambers 20 and 30 via which ballast of the individual parts of the drone is controllable, as required. Drone 10 also includes separate propellers for aerial traversal and hydraulic thrusters for marine traversal, thereby improving efficiency of such traversal. Rotor arms 18 are also deployable to facilitate either aerodynamic or hydrodynamic traversal requirements, further improving efficiency of operation, particularly when the drone 10 is submerged.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. In the example embodiments, well-known processes, well-known device structures, and well-known technologies are not described in detail, as such will be readily understood by the skilled addressee. Variations (e.g. modifications and/or enhancements) of one or more embodiments described herein might become apparent to those of ordinary skill in the art upon reading this application. The inventor(s) expects skilled artisans to employ such variations as appropriate, and the inventor(s) intends for the claimed subject matter to be practiced other than as specifically described herein.

The use of the terms "a", "an", "said", "the", and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It is to be appreciated that reference to "one example" or "an example" of the invention, or similar exemplary language (e.g., "such as") herein, is not made in an exclusive sense. Various substantially and specifically practical and useful exemplary embodiments of the claimed subject matter are described herein, textually and/or graphically, for carrying out the claimed subject matter. Accordingly, one example may exemplify certain aspects of the invention, whilst other aspects are exemplified in a different example. These examples are intended to assist the skilled person in performing the invention and are not intended to limit the overall scope of the invention in any way unless the context clearly indicates otherwise.

The invention claimed is:

1. A hybrid aerial hydro drone comprising:

an ovoid-shaped streamlined fluid-tight body which facilitates aerodynamic and hydrodynamic traversal and defining an internal cargo space accessible via a sealable hatch;

four hydraulic thrusters circumferentially spaced about an outer surface of the ovoid-shaped body and configured to propel the ovoid-shaped body in a marine environment, each hydraulic thruster arranged on a quadrant of said ovoid-shaped body to facilitate controlled marine propulsion, wherein each of the hydraulic thruster is swivelably arranged on the ovoid-shaped body to allow steering in the marine environment; and a plurality of rotor arms arranged on the ovoid-shaped body, each rotor arm comprising a rotor system configured to propel said ovoid-shaped body in an aerial environment, each arm deployably configured between a deployed position in which the rotor system is extended from the ovoid-shaped body for aerial traversal, and a folded position in which the arms are hydrodynamically folded behind the ovoid-shaped body for submerged marine traversal, wherein each rotor arm comprises a rotor arm ballast chamber;

wherein the ovoid-shaped body includes a controller, an energy source, a main ballast chamber and a pump, said controller configured to:

for aerial traversal, actuate each of the rotor arm into the deployed position, operate the pump to discharge liquid from the main ballast chamber and control the rotor systems as required for controlled flight; and for marine traversal, actuate the rotor arms into the folded position, operate the pump to charge the main ballast chamber with liquid and control each of the hydraulic thruster as required for submerged marine traversal, wherein the pump comprises a snorkel to facilitate charging and discharging of fluid from each of the main ballast chamber and rotor arm ballast chamber;

wherein the controller is further configured to:

discharge liquid from each rotor arm ballast chamber during aerial traversal; and regulate and control liquid ballast within each respective rotor arm ballast chamber to facilitate controlled submerged marine propulsion during marine traversal;

wherein each rotor arm ballast chamber comprises a piston and cylinder arrangement configured to pneumatically syringe liquid from the marine environment, into or out of said rotor arm ballast chamber under control of the controller to regulate each rotor arm ballast chamber.

2. The hybrid aerial hydro drone of claim 1, wherein the controller is configured to monitor and/or regulate an internal temperature and/or pressure of the internal cargo space.

3. The hybrid aerial hydro drone of claim 1, wherein the plurality of rotor arms comprises four rotor arms arranged in a quadcopter configuration on the ovoid-shaped body.

4. The hybrid aerial hydro drone of claim 1, wherein each rotor arm comprises an electromechanical actuator under control of the controller and configured to actuate each rotor arm between the deployed and folded positions, as required.

5. The hybrid aerial hydro drone of claim 1, wherein each rotor system comprises a propellor and an electric motor arranged on an end of the rotor arm.

6. The hybrid aerial hydro drone of claim 1, wherein the pump is configured to charge the main ballast chamber with liquid from the marine environment, as required, to regulate and control ballast for marine traversal.

7. The hybrid aerial hydro drone of claim 1, wherein the pump is selectively arranged in fluid contact with each rotor arm ballast chamber by means of suitable valves and fluid conduits.

8. The hybrid aerial hydro drone of claim 1, wherein the pump is configured to draw or expel atmospheric air in order to discharge or charge, respectively, liquid from the main ballast chamber.

9. The hybrid aerial hydro drone of claim 1, wherein the controller comprises at least one inertial measurement unit (IMU) to allow said controller to calculate altitude, velocity and/or position of the drone.

10. The hybrid aerial hydro drone of claim 1, wherein the drone includes landing gear to support the drone during take-off and landing.

11. The hybrid aerial hydro drone of claim 10, wherein the landing gear is configured to be stowed within the ovoid-shaped body or hydrodynamically folded behind the ovoid-shaped body for marine traversal.

12. The hybrid aerial hydro drone of claim 1, wherein the rotor arms are hydrodynamically folded behind the ovoid-shaped body for submerged marine traversal.

* * * * *